United States Patent
Strong

(10) Patent No.: US 9,500,484 B2
(45) Date of Patent: Nov. 22, 2016

(54) SYSTEM AND METHOD FOR WATER COLUMN AIDED NAVIGATION

(71) Applicant: Teledyne RD Instruments, Inc., Poway, CA (US)

(72) Inventor: Brandon S. Strong, San Diego, CA (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 14/439,213

(22) PCT Filed: Oct. 28, 2013

(86) PCT No.: PCT/US2013/067146
§ 371 (c)(1),
(2) Date: Apr. 28, 2015

(87) PCT Pub. No.: WO2014/070683
PCT Pub. Date: May 8, 2014

(65) Prior Publication Data
US 2015/0300822 A1    Oct. 22, 2015

Related U.S. Application Data

(60) Provisional application No. 61/719,916, filed on Oct. 29, 2012.

(51) Int. Cl.
*G01C 21/12* (2006.01)
*G01P 5/00* (2006.01)
(Continued)

(52) U.S. Cl.
CPC ............ *G01C 21/12* (2013.01); *G01P 3/26* (2013.01); *G01P 5/001* (2013.01); *G01P 5/241* (2013.01); *G01S 15/60* (2013.01); *G01S 19/13* (2013.01)

(58) Field of Classification Search
CPC ....... G01C 21/12; G01S 19/13; G01S 15/60; G01S 15/58; G01P 3/26; G01P 5/001; G01P 5/241
See application file for complete search history.

(56) References Cited

U.S. PATENT DOCUMENTS

| | | | |
|---|---|---|---|
| 4,032,759 A | 6/1977 | Danik | |
| 5,077,700 A * | 12/1991 | Shaw | G01S 15/60 367/90 |

(Continued)

FOREIGN PATENT DOCUMENTS

| | | | |
|---|---|---|---|
| CN | 102323586 B | * | 2/2013 |
| WO | WO92/05456 | * | 4/1992 |

OTHER PUBLICATIONS

M.J. Stanway; Water Profile Navigation with an Acoustic Doppler Current Profiler; Oceans 2010 IEEE- Sydney; 2010; pp. 1-5.*

(Continued)

*Primary Examiner* — Michael J Zanelli
(74) *Attorney, Agent, or Firm* — Knobbe, Martens, Olson & Bear, LLP

(57) ABSTRACT

Underwater vehicles may fix their position from GPS at the surface of the water and use bottom track for dead reckoning once it has descended to within tracking range of the bottom of a body of water. This disclosure describes a method and system for navigation through the water through depths where GPS is not available using current profiles from sonar systems including acoustic Doppler current profilers (ADCP). This extrapolation of earth referenced current profiles can provide a way to estimate vehicle motion below the surface before the vehicle reaches the bottom. Once bottom track is achieved, the corrected reference for vehicle motion improves the vehicle position estimate. A Kalman filter updates vehicle position and current profile estimates during descent, and the bottom track when the bottom comes within range to enable navigation of underwater vehicles.

18 Claims, 12 Drawing Sheets

(51) Int. Cl.
  *G01P 5/24*  (2006.01)
  *G01S 15/60* (2006.01)
  *G01P 3/26*  (2006.01)
  *G01S 19/13* (2010.01)

(56) References Cited

U.S. PATENT DOCUMENTS

| | | | | |
|---|---|---|---|---|
| 5,615,173 | A * | 3/1997 | Brumley | G01S 15/582 367/90 |
| 7,911,880 | B2 * | 3/2011 | Lohrmann | G01S 7/523 367/90 |
| 2006/0235583 | A1 | 10/2006 | Larsen | |
| 2008/0144442 | A1 | 6/2008 | Combee et al. | |
| 2009/0238042 | A1 * | 9/2009 | Hawkinson | G01C 21/00 367/89 |
| 2009/0248301 | A1 | 10/2009 | Judd et al. | |
| 2010/0106349 | A1 * | 4/2010 | Rathjen | G01C 21/00 701/21 |
| 2011/0149689 | A1 | 6/2011 | Lohrmann et al. | |
| 2011/0184644 | A1 | 7/2011 | McBurney | |

OTHER PUBLICATIONS

Stanway, Jordan M., "Dead Reckoning Through the Water col. with an Acoustic Doppler Current Profiler: Field Experiences," *Oceans 2011*, IEEE, Sep. 19, 2011, pp. 1-8, XP032075873, ISBN: 978-1-4577-1427-6.

International Search Report and Written Opinion dated Mar. 20, 2014 for International Patent Application No. PCT/US2013/067146 which corresponds to subject U.S. Appl. No. 14/439,213, and cites the above-identified references numbered 1, 2, and 4-6.

International Preliminary Report on Patentability dated Apr. 16, 2015 for International Patent Application No. PCT/US2013/067146 which corresponds to subject U.S. Appl. No. 14/439,213, and cites the above-identified reference numbered 3.

Extended European Search Report dated May 30, 2016 for European Patent Application No. EP 13 850 613.4 which corresponds to subject U.S. Appl. No. 14/439,213, and cites the above-identified reference numbered 7.

* cited by examiner

SYSTEM AND METHOD FOR WATER COLUMN AIDED NAVIGATION

CROSS REFERENCE TO RELATED APPLICATIONS

This application is the national phase under 35 U.S.C. §371 of International Application No. PCT/US2013/067146, filed Oct. 28, 2013, and which claims the benefit under 35 U.S.C. §119(e) of U.S. Provisional Application No. 61/719,916, filed Oct. 29, 2012. The disclosure of the aforementioned applications are herein incorporated by reference in their entirety.

BACKGROUND

1. Field

The disclosed technology relates to underwater acoustic measurement systems and, more particularly, to acoustic Doppler current profilers used to aid in navigation of a vehicle, such as an underwater vehicle (UV), or a GPS-denied vehicle.

2. Description of the Related Technology

An important category of scientific instrumentation relates to precision underwater acoustics. With advanced transducers that transmit sound pulses and receive resulting echoes, water velocities in individual ceils in a water column can be measured. This type of measurement is known in the industry as a current profile. As described in U.S. Pat. No. 6,052,334, the use of Doppler sonar to measure currents in a fluid medium is well-established. Some additional features related to acoustic Doppler current profilers (ADCPs) are described in U.S. Patent Publication No. 2012/0302908, the entire disclosure of which is incorporated by reference herein. Conventional ADCPs can use an array of acoustic transducers arranged in the well-known Janus configuration. This configuration can include four acoustic beams, paired in orthogonal planes. In addition, a phased array having a single transducer may be configured to generate multiple beams such as in a Janus configuration. The ADCP can measure the component of velocity projected along the beam axis, averaged over a range cell whose beam length is roughly half that of the emitted acoustic pulse. Since the mean current is assumed to be horizontally uniform over the beams, its components can be recovered by differencing opposing beams. This procedure is relatively insensitive to contamination by vertical currents and/or unknown instrument tilts.

SUMMARY OF CERTAIN INVENTIVE ASPECTS

The system, method, and computer-readable media of the invention each have several aspects, no single one of which is solely responsible for its desirable attributes. Without limiting the scope of this invention, its more prominent features will now be briefly discussed.

In one embodiment, a system for navigating a vehicle is provided. The system includes an earth reference sensor configured to measure an earth referenced vehicle velocity. The system further includes a current profiler configured to obtain a current profile observation relative to the vehicle. The current profile observation is an earth referenced current profile when the earth reference sensor measure of vehicle velocity is available. The current profile is an observed water profile when the earth reference sensor measure is not available. The system further includes a processor. The processor is configured to construct averaged estimates of the earth referenced current profile in response to an initial earth reference vehicle velocity. The processor is further configured to use sequential observed water profiles and shift them spatially to a fixed grid of depth cells when the earth reference measure is not available. The processor is further configured to get a water column derived estimate of change in vehicle velocity by differencing successive observed profiles and averages over the fixed grid of depth cells. The processor is further configured to determine a water column derived estimate of vehicle velocity by accumulating the initial earth reference vehicle velocity and subsequent changes in the vehicle velocity. The processor is further configured to use the water column derived estimate of vehicle velocity until an earth referenced vehicle velocity is available for navigation solution and for earth referencing the current profile.

In one embodiment, a method for navigating a vehicle is provided. The method includes measuring, by an earth reference sensor, an earth referenced vehicle velocity. The method further includes obtaining, by a current profiler, a current profile observation relative to the vehicle. The current profile observation is an earth referenced current profile when the earth reference sensor measure of vehicle velocity is available. The current profile is an observed water profile when the earth reference sensor measure is not available. The method further includes constructing averaged estimates of the earth referenced current profile in response to an initial earth reference vehicle velocity. The method further includes shifting sequential observed water profiles spatially to a fixed grid of depth cells when the earth reference measure is not available. The method further includes getting a water column derived estimate of change in vehicle velocity by differencing successive observed profiles and averages over the fixed grid of depth cells. The method farther includes determining a water column derived estimate of vehicle velocity by accumulating the initial earth reference vehicle velocity and subsequent changes in the vehicle velocity. The method further includes using the water column derived estimate of vehicle velocity until an earth referenced vehicle velocity is available, for navigation solution and for earth referencing the current profile.

In an embodiment, a system for navigating a vehicle is provided. The system includes means for measuring an earth referenced vehicle velocity. The system further includes means for obtaining a current profile observation relative to the vehicle. The system farther includes means for constructing averaged estimates of the earth referenced current profile in response to an initial earth reference vehicle velocity. The system further includes means for shifting sequential observed water profiles spatially to a fixed grid of depth cells when the earth reference measure is not available. The system farther includes means for getting a water column derived estimate of change in vehicle velocity by differencing successive observed profiles and averages over the fixed grid of depth cells. The system further includes means for determining a water column derived estimate of vehicle velocity by accumulating the initial earth reference vehicle velocity and subsequent changes in the vehicle velocity. The system further includes means for using the water column derived estimate of vehicle velocity until an earth referenced vehicle velocity is available, for navigation solution and for earth referencing the current profile.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

DETAILED DESCRIPTION OF CERTAIN EMBODIMENTS

Figure 1A:
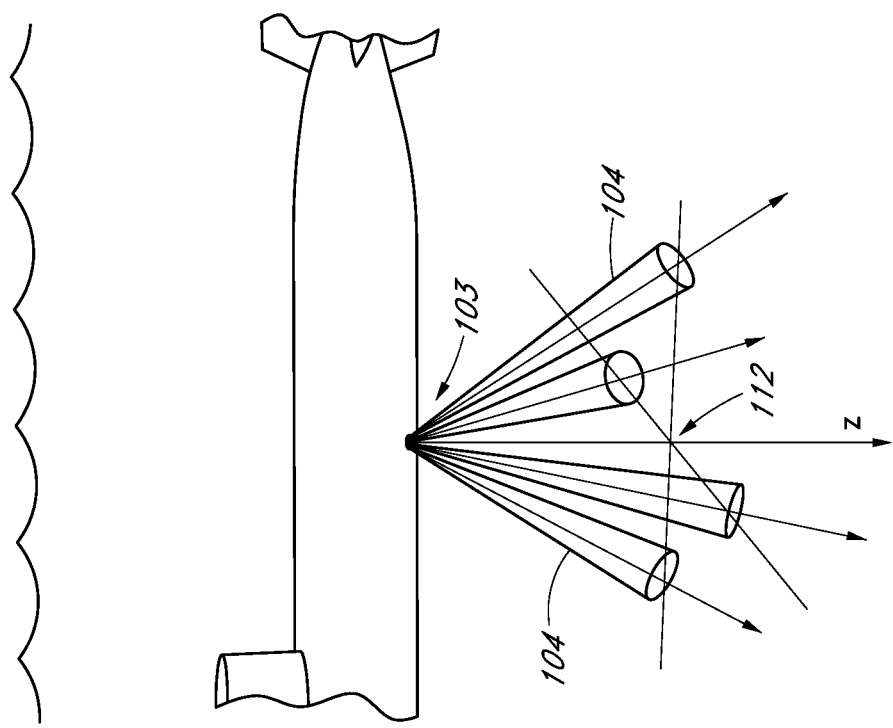
FIG. 1A is a perspective view of an acoustic sonar system used for measuring current profiles, the system being mounted on a submerged moving platform.

Vehicles can determine their position with a satellite based positioning systems such as, for example, the well-known global positioning navigation system (GPS) at the surface of a body of water, e.g., ocean or sea. However, such vehicles will lose the ability to capture GPS signals once submerged in water. When the vehicle gets to the bottom, the bottom tracker (dead reckoning) provides velocity information but not position. Accordingly, there is a need for underwater vehicles to better navigate in the absence of access to a satellite positioning system.

Vehicles can navigate using ADCP (Acoustic Doppler Current Profiler) current profiles when submerged. An underwater vehicle can have a position fix from a GPS at a surface of a body of water, and can use bottom track for dead reckoning once it has descended to within tracking range of a bottom of the body of water. One challenge is to determine the vehicle's position at the bottom, by tracking its motion through the transition from surface to bottom. The use of earth-referenced current profiles during the descent can provide an estimate of the water reference frame and therefore an estimation of the vehicle motion. GPS position and velocity combined with current profiles measured at the surface can provide the first earth referenced measurement of the water reference frame. During the descent, subsequent profiles can provide profile gradients that can be used to extend the earth-referenced profile to the bottom. This extrapolation of earth referenced current profiles can provide a way to estimate vehicle motion below the surface before the vehicle reaches the bottom. Once bottom track is achieved, the corrected reference for vehicle motion can be used to improve the estimate of position. The independent water column derived estimate of vehicle motion can be used to navigate.

A vehicle at the surface or under water can use an Acoustic Doppler Current Profiler (ADCP) to profile currents relative to the platform, and an earth reference means to determine an earth referenced (ER) measure of the platform motion. The earth reference means can comprise an inertial system, a bottom tracking ADCP that measures the platform's motion relative to the earth, or any suitable means that can track the position of the fixed earth reference relative to a moving platform, for example, a GPS system. A pressure sensor estimates vehicle depth. At some times the earth reference sensor may not be available; for example, GPS may not be available as a vehicle descends under the surface of the water. Furthermore, bottom tracking may only be available below a depth where the bottom is within the range of the ADCP.

One principle behind ADCP measurement is that current profiles can be measured by the ADCP. The ADCP or multiple ADCPs can be mounted on the vehicles and face upwards, downwards, or at an angle to measure current profiles as a function of depth within the range of the ADCP.

One strategy is to improve the estimate of the current profile. Single ping measurement of the observed profile can be noisy. If the water velocity is indeed relatively static, then estimates of the current profile can be averaged in time to get a lower variance. This can also become significant as a descending underwater vehicle (UV) measures depths that have not had the benefit of GPS to isolate the current profile from the vehicle motion. Because the vehicle velocity can be changing in time, it cannot be averaged in time with much accuracy.

By averaging a few hundred current profiles at the surface, the navigation process begins with a relatively quiet estimate of the current, in which the vehicle velocity was provided by GPS and could be removed from the observed profiles. As the vehicle descends, there is no longer an independent source for vehicle motion and the process can extend the range of the subsequent profiles.

As the vehicle descends, the process may no longer have an independent source for vehicle motion and the process can extend the range of the subsequent profiles. One way of combining the data is a weighted average. Current profiles can be accumulated in both space and time. While the UV is descending, successive pings can be accumulated. The difference approach (described above) can be used to remove the rough estimate of the vehicle velocity, then profile data can be weighted and averaged. The initial profile estimate can be weighted heavily because many pings could have occurred at the surface. New data can be lightly weighted because it has fewer overlapping samples. As the UV descends, previously measured depths can overlap with the new profiles and new depths can be measured. The new bins at the end of the profile can have the smallest N, but successive overlapping profiles can progressively increase the number of independent samples until the UV descends below that depth. By keeping track of how many observations have occurred for a given depth cell, each cell can be appropriately weighted.

The averaged (quieted) current profile can then be subtracted from the instantaneous observation in an attempt to isolate a better estimate of vehicle velocity than a single ping typically provides. Bins can be weighted with successive pings. Initial values can have large weight from preliminary averaging at the surface. Subsequent bins can accumulate more samples as overlapping depths are measured in the ADCPs profile window. Bins at the end of the profile range can have relatively few independent measures because they have just come into the profile window. The preliminary approach (weighted averaging) can provide intuition about the problem. This can be a problem of optimally combining different kinds of data with different and/or changing variances. This type of problem can be well suited to a Kalman filter.

Ongoing averaging can quiet the estimates (reduce uncertainty) of the average current profile. At any instant in time, the bins at the end of the profile have the fewest samples included in their average. Velocity estimate variance has the characteristics of random walk. Averaging over a plurality of readings at the surface helps bound the error of current profile estimates close to the surface.

Subsequent profile averaging can be limited in its benefit. For instance, even with a perfect estimate of the current profile, the process still subtracts the currents from our observation ping to get instantaneous vehicle velocity in certain embodiments. The observation ping can still have single ping variance, so about 50% of the measurement can still have single ping variance. Taking this cue, the process can attempt to average observation pings in a narrow window in time, before differencing to get our change in velocity. This can work as long as the change in vehicle velocity is relatively small during the averaging time. In this approach, the process are essentially filters out high frequency noise from the estimate using the bandwidth of a small boxcar average.

Averaging observations in a narrow window reduces variance of the core measurement and selectively removes noise at higher frequencies. While the velocity can look quieter, longer period variability can still produce random walk when accumulate velocity differences into velocity. Low single ping standard deviation of the observations may be an important factor to limiting random walk and producing usable estimates.

The bandwidth of time averaging can bias the result, even in a noiseless environment. The bias can be a result of the bandwidth of the time average relative to the non-linearity of the rate of change of velocity.

The velocity estimate at the far end (close to the bottom) is bounded by the high accuracy bottom track. The addition of bottom track velocity at the end of the descent can provide a way to "back correct", or correct the estimates moving backward in time. This can be of limited value if random walk is large. When the measurement noise is small, however, it can do an excellent job of restoring the whole velocity time series.

One way to implement the navigation algorithm is with a Kalman filter. In one embodiment, a Kalman filter can provide a substantially optimal weighting of measurements in the sense that it can give the maximum likelihood solution, which for Gaussian distributed errors can be the best that can be achieved using data only from the past and present. A Kalman filter can operate in real time by alternating between two steps, a prediction step in which a physical system model is used to propagate the states of internal parameters forward in time, and a correction step in which observed measurements are optimally combined with the propagated states to improve them.

The optimality of the Kalman filter can be subject to the validity of the physical system model. There can be considerable flexibility available in the design of this model. One relatively simple choice is to model the vehicle velocity as being subject to a large acceleration between velocity measurements, forcing the velocity to be determined almost entirely from the most recent relative velocity profile and the past averaged water current profile, ignoring any persistence of the vehicle velocity from the previous time step due to inertia. Dead-reckoned position can come directly from the integrated velocity time series in certain embodiments. However, if an acceleration parameter (which can be referred to as "plant noise") is reduced to a value more characteristic of the standard deviation of the actual vehicle accelerations that may not be able to be predicted from the motor control signals, then the effective averaging time can be increased, resulting in more accurate navigation. More sophisticated averaging can be achieved by adding more states to the physical model.

Besides the Kalman states for vehicle velocity, position, and possibly additional dynamical states, there can also be states for the depth cells of the entire velocity profile from surface to bottom. Interpolation to account for misalignment between these Kalman state depth cells and the ADCP depth cells of the observations can be achieved using a matrix that describes a linear relationship between the states and the measurements and a cross-correlation matrix of the measurements. Unobserved Kalman state depth cells can be given relatively high initial variances, which persist until the ADCP profile gets within range.

When the vehicle reaches a sufficiently depth to begin bottom tracking, additional bottom track measurements can be incorporated into the Kalman filter. Because the Kalman filter can keep track of the covariances among all pairs of states, it can immediately correct the vehicle velocity and position for past errors as best it can in light of the more accurate velocity information from the new bottom track measurements. According to certain embodiments, back-calculation is not necessary, unless a smoothed vehicle trajectory that uses measurements later in time than the time of interest is desired.

For some implementations, the single ping standard deviation appears to be a dominant source of error. For some implementations, averaging of profiles with time can be helpful, yet can be limited because the raw observation can still contain measurement noise. Such an error can shows up as a random walk. Random walk can be a consequence of accumulating measurement noise. Random walk can be characteristic of navigation problems where an accumulation is performed to get velocity from acceleration and/or distance from velocity. Averaging at the surface and/or bottom track at the bottom can help to bound the solution at the end points. Averaging estimates over the whole profile, at a single instant in time, can be beneficial. Averaging observations in a narrow window around the time of interest can be beneficial. In certain instances, this may not solve the problem of random walk. The width of the window relative to the rate of change of velocity can be important in some applications.

A Kalman filter is well suited to this type of problem. Both a Kalman filter and a moving average filter can be chosen such that the width of the time averaging does not smear or bias (or otherwise influence) the result to a greater extent than the benefit of lower variance.

One inventive aspect is a method for aiding in navigation of an underwater vehicle (UV), the method comprising obtaining an earth referenced position of the UV at a surface of a body of water; determining an estimate of UV motion as the UV descends into the body of water based on combining data indicative of an earth referenced position, velocity of the UV and current profiles measured at a surface of the body of water; and estimate a position of the UV based on the estimate of UV motion. In certain embodiments, this method can include incorporating a bottom tracking data when determining the estimate of UV motion. In some of these embodiments, a Kalman filter can be used to weigh bottom track data relative to other data in determining the estimate of UV motion. It will be understood that the method can be applied to other moving platforms submerged in water. Further, another example of a described inventive aspect is a range estimation system relating to transmission and reception of acoustic signals in a fluid medium, the system comprising a sonar system having at least one transducer configured to generate an acoustic beam and receive echoes from the beam, and a processor configured to estimate a position of a moving platform that as it descends below a surface of the fluid medium based on combining data indicative of a GPS position, velocity of the moving platform and current profiles measured at a surface of the body of water. In certain embodiments, the processor can determine the estimate of platform motion by weighing observed measurements relative to propagated states. In some of these embodiments, the processor can implement a Kalman filter.

A number of assumptions facilitate the navigation process. The first assumption is that we know the depth of each measurement so we can spatially interpolate subsequent pings such that we have velocity observations referenced to a fixed spatial grid of depths. The second assumption is that motion is superimposed on the observed water profile so vehicle motion is the same spatially across all bins, at an instant in time. The third assumption is that vehicle velocity is changing with time in unknown fashion. The fourth assumption is that the current profile is mostly static during the duration of the vehicle's descent. The current profile is static from ping to ping. The fifth assumption is that nonstatic environmental effects (such as waves or internal waves) are zero mean processes that average out without special handling. The sixth assumption is that there is opportunity to sit at the surface a few minutes prior to descending and refine the preliminary current profile estimate with averaging to lower variance using GPS as an unambiguous earth reference for vehicle position and motion.

Isolating vehicle motion may involve differencing successive observed profiles leaving the change in vehicle velocity. Integrating these vehicle velocity changes to get vehicle motion can introduce a random walk. Random walk error can be influenced significantly by the variance. According to certain embodiments, in order to reduce the variance of this estimate as much as possible, we would like to average current profiles in time, at common locations in space, and we would like to average vehicle motion in space at an instant in time.

Based on the assumptions above, we can difference successive observed measurements in time at depths where they overlap. If the currents are unchanging, then the remainder can be a profile of estimates of vehicle motion and measurement noise. The contribution of the vehicle velocity can be substantially the same for all of the range cells, so we can average the change in velocity over the bins.

Figure 1B:
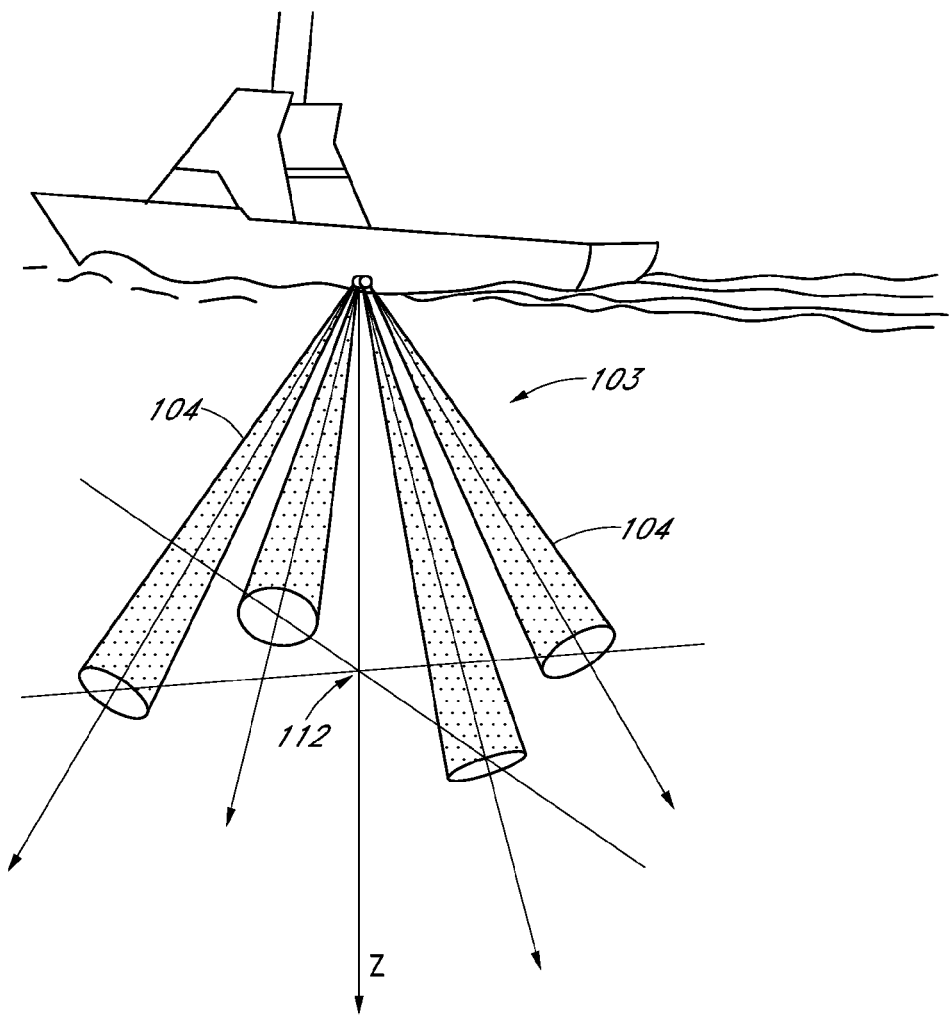
FIG. 1B is a perspective view of a bottom mounted acoustic sonar system used for measuring current profiles, the system being mounted on a mobile surface platform in a downward looking direction.

Velocity estimates of water currents can be obtained using measurement tools such as acoustic Doppler current profilers (ADCP), FIGS. 1A and 1B illustrate systems that can obtain measurements, which can account for any of the types of motion described above in determining current profiles. FIG. 1A is a perspective view of an acoustic sonar system used for measuring current profiles, the system being mounted on a submerged moving platform. The system 100 is mounted to moving platform, such as a submarine or AUV (Autonomous Underwater Vehicle), and includes a body element containing sonar electronics and processing equipment, and a multi-transducer array 103 having the individual transducer elements arranged in the Janus configuration. This transducer array 103 generates acoustic beams 104 which are coplanar in the vertical plane 106 yet divergent from a horizontal plane 108 parallel to the surface of the fluid medium 110. The fluid medium 110 is most often natural or man-made bodies of water, especially the ocean. It should be noted that while the Janus array configuration is used in the embodiment of FIG. 1A, other array configurations which form beams having an angular relationship to the horizontal plane 108 may also be used. For example, a "pinwheel" array (e.g., one where the acoustic beams are skew-divergent from the longitudinal axis of the array), or "star" array (non-coplanar, non-skewed beams) may also be used. Additionally, phased or time-delayed arrays may be used in conjunction with the embodiments disclosed herein.

As shown in FIG. 1B, the transducer array 103 may be used from a surface ship, such as within the hull of a surface vessel 120, such that downward-projecting acoustic beams 104 are generated. In this way, the current profile can be measured. For example, if a surface ship loses GPS access, it can navigate using the described herein.

Figure 2:
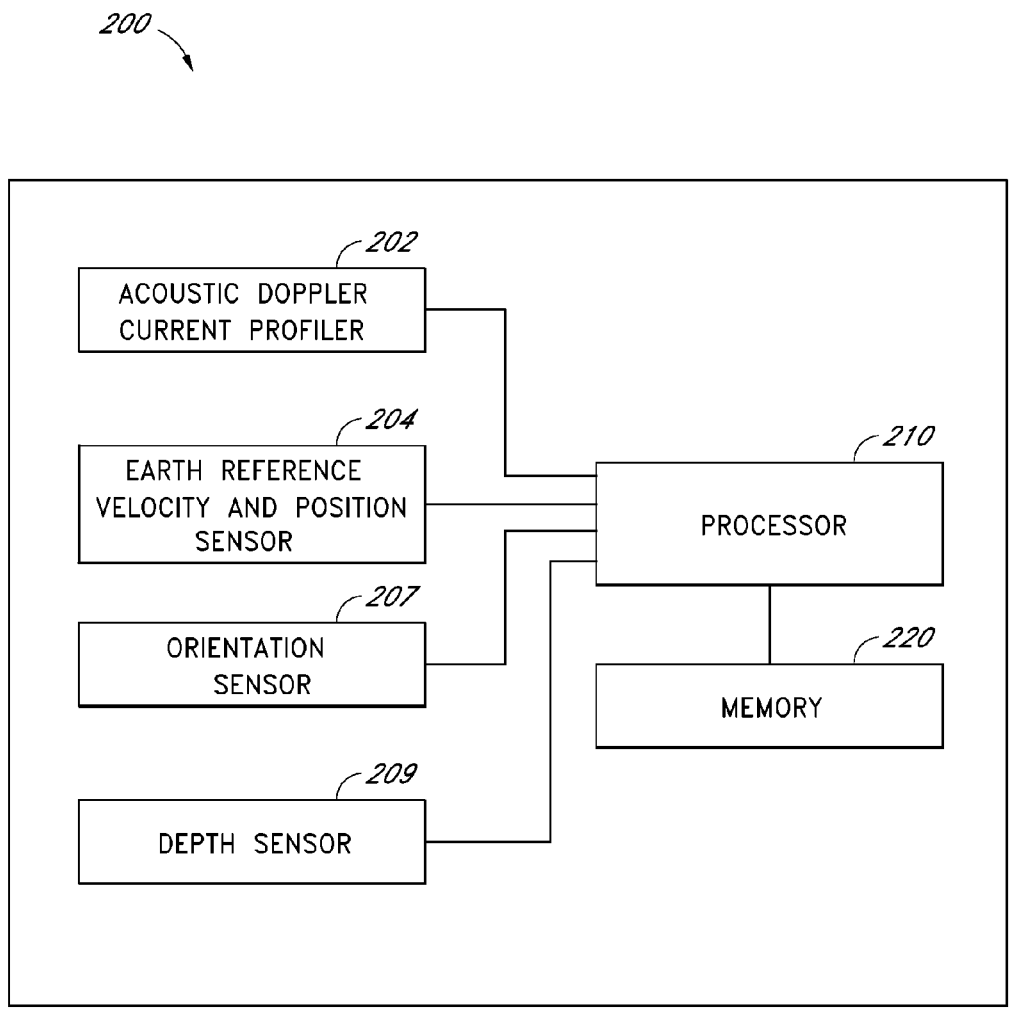
FIG. 2 is a functional block diagram of a system for determining current profile according to one embodiment disclosed herein.

FIG. 2 is a functional block diagram of a system according to one embodiment disclosed herein. The illustrated system 200 includes an ADCP 202 and an earth reference velocity and position sensor 204 as inputs to a processor 210. ADCP 202 functions as a current profiler below the surface, and as a bottom tracker when in range of the bottom. Orientation sensor 207 measures data indicative of vehicle heading, pitch, and roll. Pressure sensor 209 measures data indicative of depth. Other input devices, such as temperature sensors and acoustic transducers, can also provide data to the processor 210. The raw data, partially processed data, or fully processed data can be stored in a memory 220 of the system 200.

Figure 3:
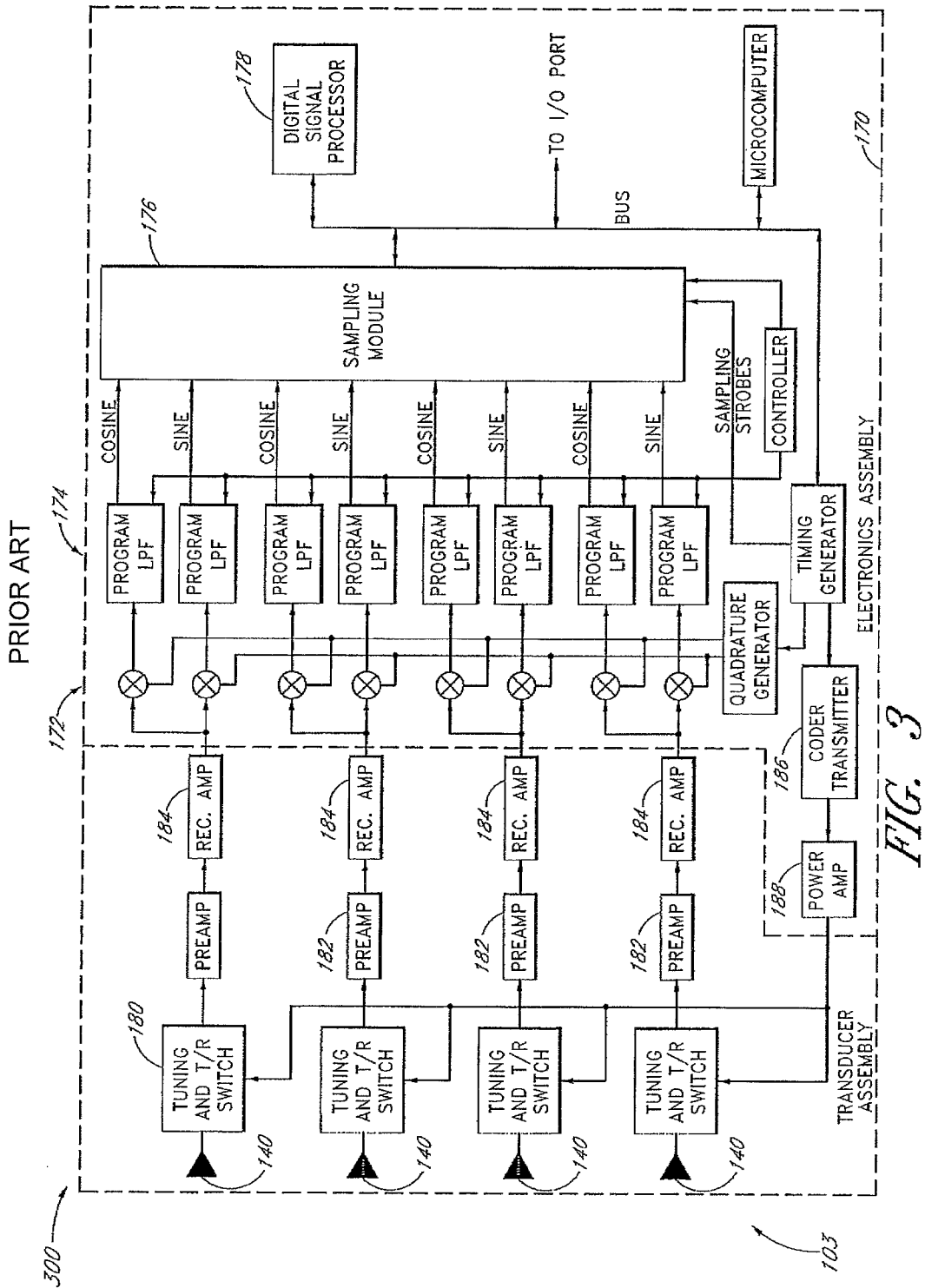
FIG. 3 is a block diagram of an exemplary embodiment of the electronics for a broadband acoustic Doppler current profiler (ADCP) of FIG. 2.

FIG. 3 illustrates an exemplary embodiment of the electronics for a broadband ADCP 300, such as a Workhorse Monitor ADCP sold by Teledyne RD Instruments, can be used in connection with any of the embodiments disclosed herein. While the following discussion may refer to an ADCP system, other models and types of sonar systems, such as narrowband Doppler systems or non-Doppler-based systems, may be used with the embodiments disclosed herein, depending on the particular application and needs of the user.

Referring again to FIG. 3, the transducer array 103 can be electrically connected to the electronics assembly 170 which can include a mixer network 172, low pass filter network 174, sampling module 176, and digital signal processor (DSP) 178. Signals generated by the transducer array elements 140 upon the receipt of acoustic signals can be fed via the transmit/receive switches 180 to preamplifiers 182 and receiver amplifiers 184, which condition and amplify the signal(s) for further processing by the electronics assembly 170. A coder transmitter 186 and power amplifier 188 can be used in conjunction with the DSP 178 to feed transmission signals to the transducer elements 140 via the transmit/receive switches 180. Thus, the same transducer elements can be used for both transmit and receive functions. Additional details regarding the exemplary broadband ADCP system are contained in U.S. Pat. No. 5,208,785, "Broadband Acoustic Doppler Current Profiler" assigned to Teledyne RD Instruments, Inc., which is incorporated herein by reference in its entirety.

Figure 4:
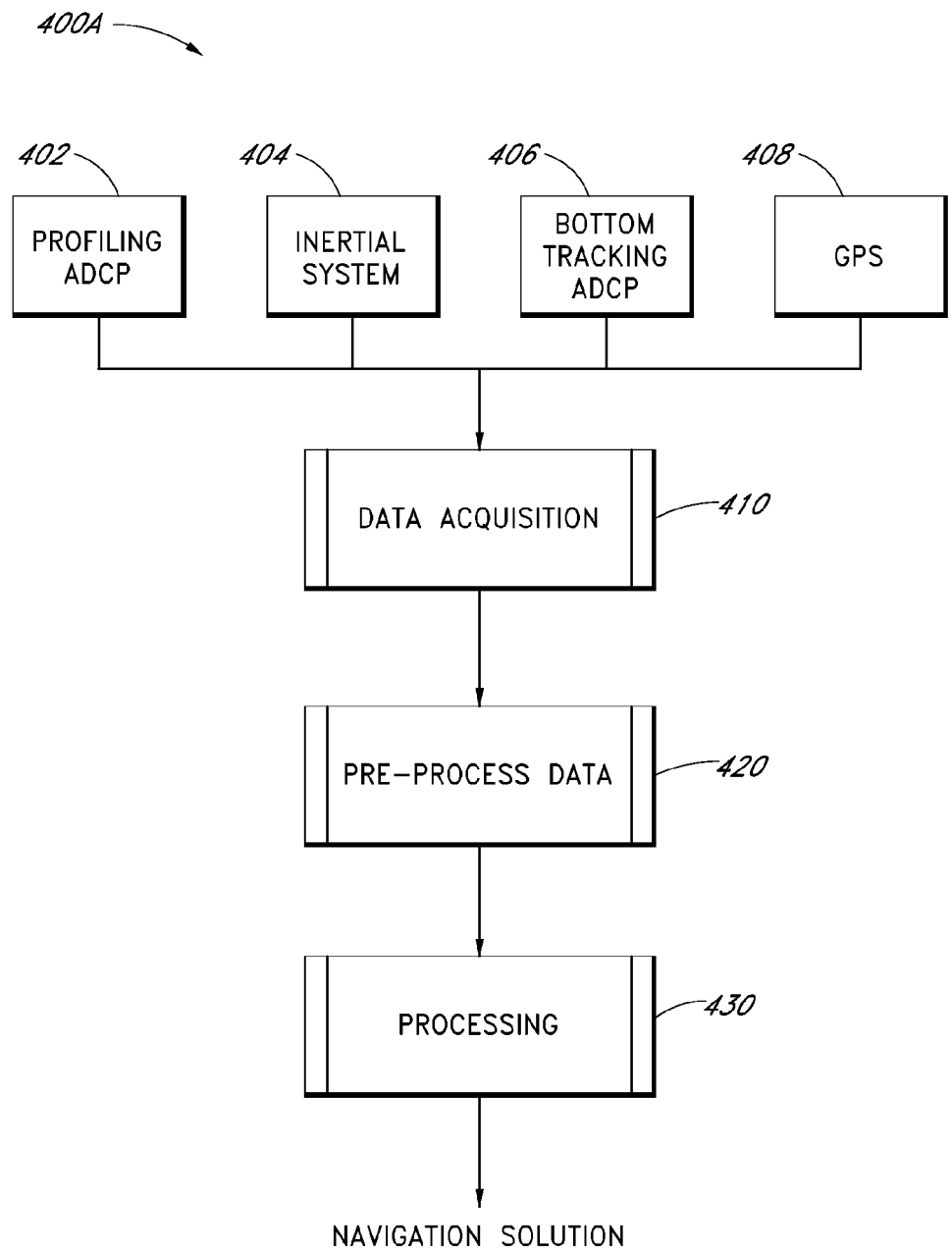
FIG. 4 is a top level process block diagram of a system for navigating according to one embodiment.

FIG. 4 is a top level block diagram of a system 400A that can determine one or more navigation solutions such as the current profile and facilitate navigation, according to one embodiment. The illustrated system 400A can obtain data using any combination of a profiling ADCP 402, an inertial system 404, a bottom tracking ADCP 406, and a GPS receiver 408. The system 400A can also include a data acquisition system 410, a pre-processing system 420, and a processing system 430. At least a portion of one or more of the data acquisition system 410, the pre-processing system 420, and the processing system 430 can be implemented on a processor, for example, the processor 210 (FIG. 2).

The inertial system 404 can be used as an earth reference. For example, in one embodiment, the inertial system 404 can be the earth reference system 204 (FIG. 2). Alternatively or additionally, the bottom tracking ADCP 406 can be used as an earth reference for velocity. For example, the bottom tracking ADCP 406 can be the earth reference system 204 (FIG. 2) in one embodiment. The bottom tracking ADCP can implement any combination of the features of the ADCP 202 (FIG. 2) and/or the ADCP 300 (FIG. 3). The bottom tracking ADCP 402 can be used to obtain data of platform motion relative to the earth. This data may be asynchronous.

Alternatively or additionally, data from a GPS 408 can be used as a source for earth reference velocity and position. For example, the earth reference system 204 (FIG. 2) can comprise a GPS system. For a surface platform, for example, as shown in FIG. 1B, using a GPS system can be advantageous.

The data acquisition system 410 can receive data from any combination of the profiling ADCP 402, the inertial system 404, the bottom tracking ADCP 406, and the GPS 408. In some embodiments, current profiler (profiling ADCP) 402 and bottom tracker (bottom tracking ADCP 406) may be the same ADCP. Additionally or alternatively, the data acquisition system 410 can receive data from any earth reference 204 (FIG. 2) and/or any input from user input device 206 (FIG. 2). In addition, the data acquisition system 410 can synchronize the received data.

The pre-processing system 420 can be connected to data acquisition system 410, and perform one or more coordinate transformations to bring at least a portion of the received data into the same coordinate system. Lever arm corrections can also be performed by the pre-processing system 420.

Figure 5:
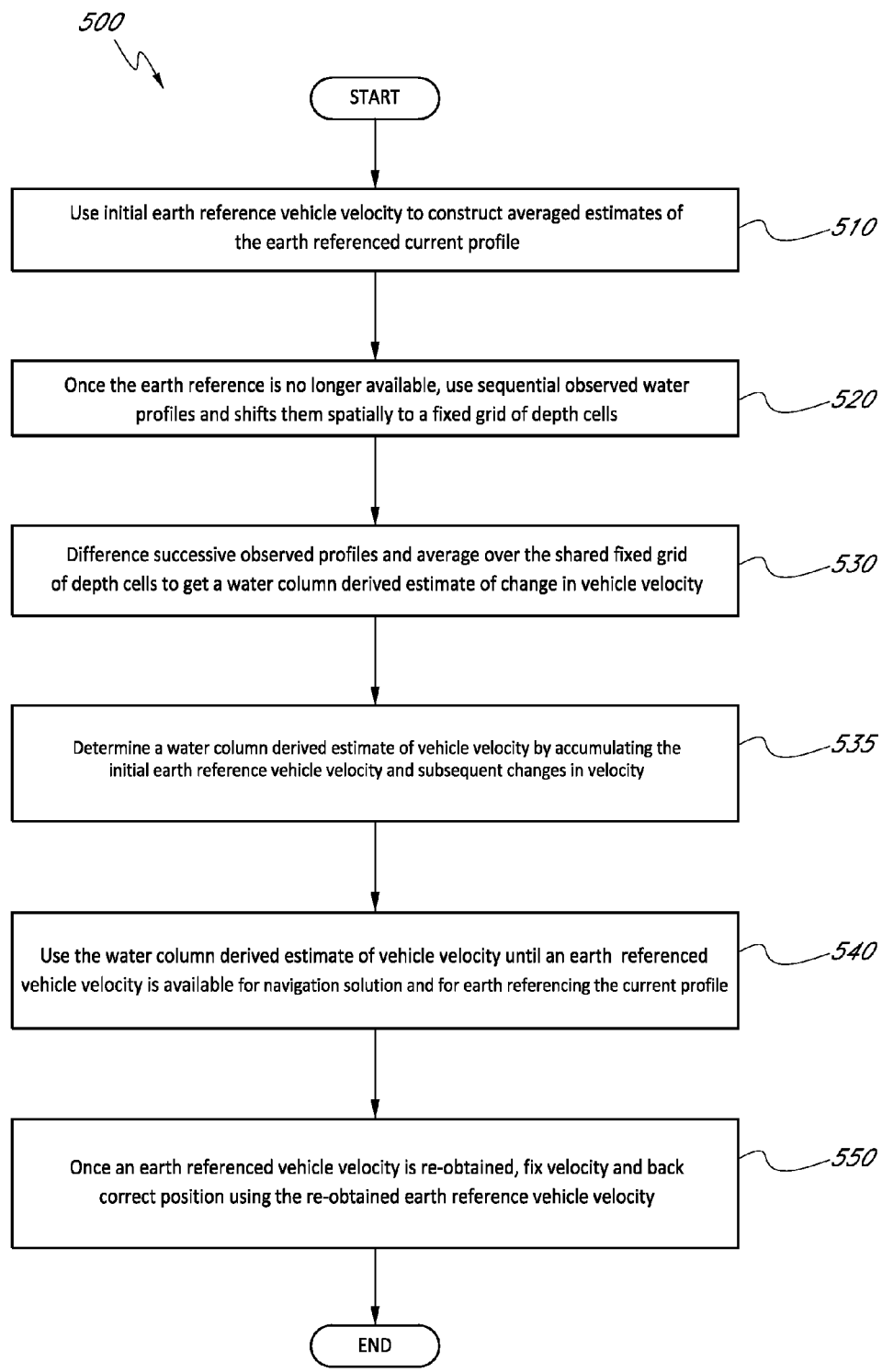
FIG. 5 is a flowchart of a process for navigating according to one embodiment.

Referring to FIG. 5, a process 500 of navigating is provided. In Block 510, the process 500 uses initial earth reference vehicle velocity to construct averaged estimates of the earth referenced current profile. In Block 520, once the earth reference is no longer available, the process 500 uses sequential observed water profiles and shifts them spatially to a fixed grid of depth cells. In Block 530, the process 500 differences successive observed profiles and averages over the shared fixed grid of depth cells to get a water column derived estimate of change in vehicle velocity. In Block 535, the process 500 determines a water column derived estimate of vehicle velocity by accumulating the initial earth reference vehicle velocity and subsequent changes in velocity. In Bloc 540, the process 500 uses the water column derived estimate of vehicle velocity until an earth referenced vehicle velocity is available, for navigation solution and for earth referencing the current profile. In Bloc 550, once an earth referenced vehicle velocity is re-obtained, the process 500 fixes velocity and back corrects position using the re-obtained earth reference vehicle velocity.

Figure 6:
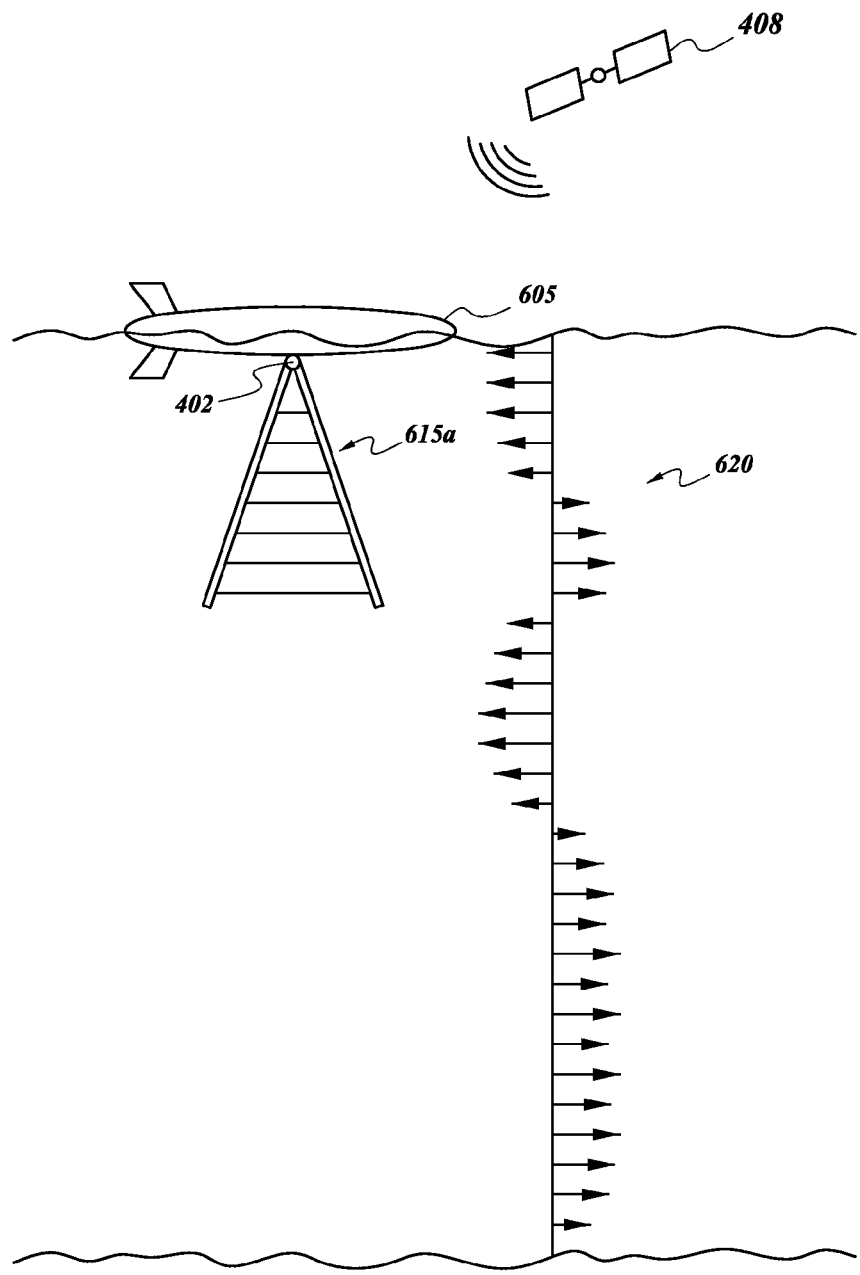
FIG. 6 illustrates an embodiment for navigating when the vehicle is on or near the surface of the water and in range to fix vehicle position using an earth reference sensor (GPS).

FIG. 6 illustrates an embodiment of a system for navigating when the vehicle is on or near the surface of the water and in range to fix vehicle position using an earth reference sensor (UPS). Vehicle 605 is at or near the surface of the water, in range of a GPS 408. Vehicle 605 position may be fixed using the GPS 408 when the vehicle 605 starts or returns to the surface to come within range of the GPS. Current profile 620 varies as a function of depth. FIG. 6 illustrates the magnitude and direction of the current for an exemplary profile. For some embodiments, the current profile 620 is estimated using a current profiler, such as profiling ADCP 402. The current profile range 615a illustrates the range of depths for which the profiling ADCP 402 estimates the current profile 620.

Figure 7:
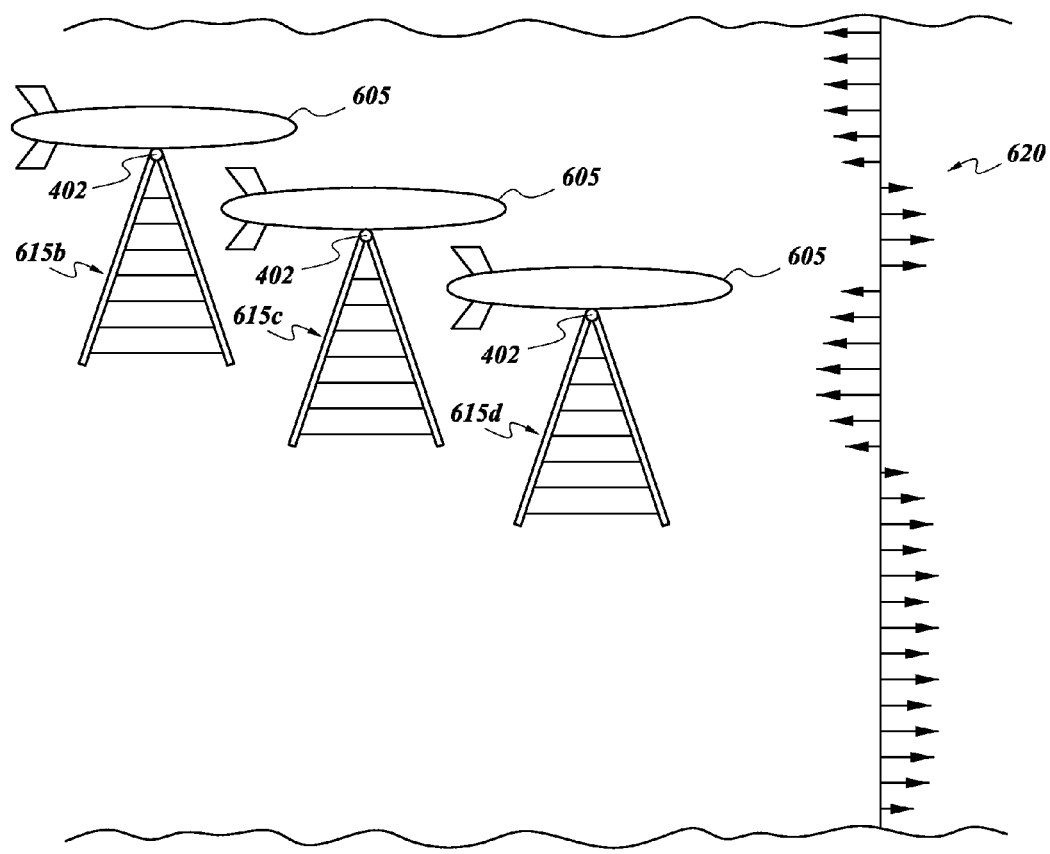
FIG. 7 illustrates an embodiment for navigating when the vehicle is below the surface of the water and estimates vehicle trajectory. The vehicle is out of range to fix position using either an earth reference sensor (GPS) or a bottom tracker.

FIG. 7 illustrates an embodiment for navigating when the vehicle 605 is below the surface of the water and estimates vehicle trajectory. The vehicle 605 is out of range to fix position using either an earth reference sensor (GPS 408) or a bottom tracker 406. Therefore, the vehicle 605 uses the current profiler (profiling ADCP 202) to estimate vehicle trajectory and the current profile 620. The current profile ranges 615b, 615c, and 615d illustrate the ranges of depths for which the profiling ADCP 402 estimates the current profile 620 as the vehicle 605 descends. In some implementations, the vehicle 605 descends; in others, the vehicle 605 ascends or moves in other patterns between fixes. The vehicle 605 estimates position between position fixes close to the surface or near the bottom, using GPS 408 or a bottom tracker 406, respectively.

Figure 8:
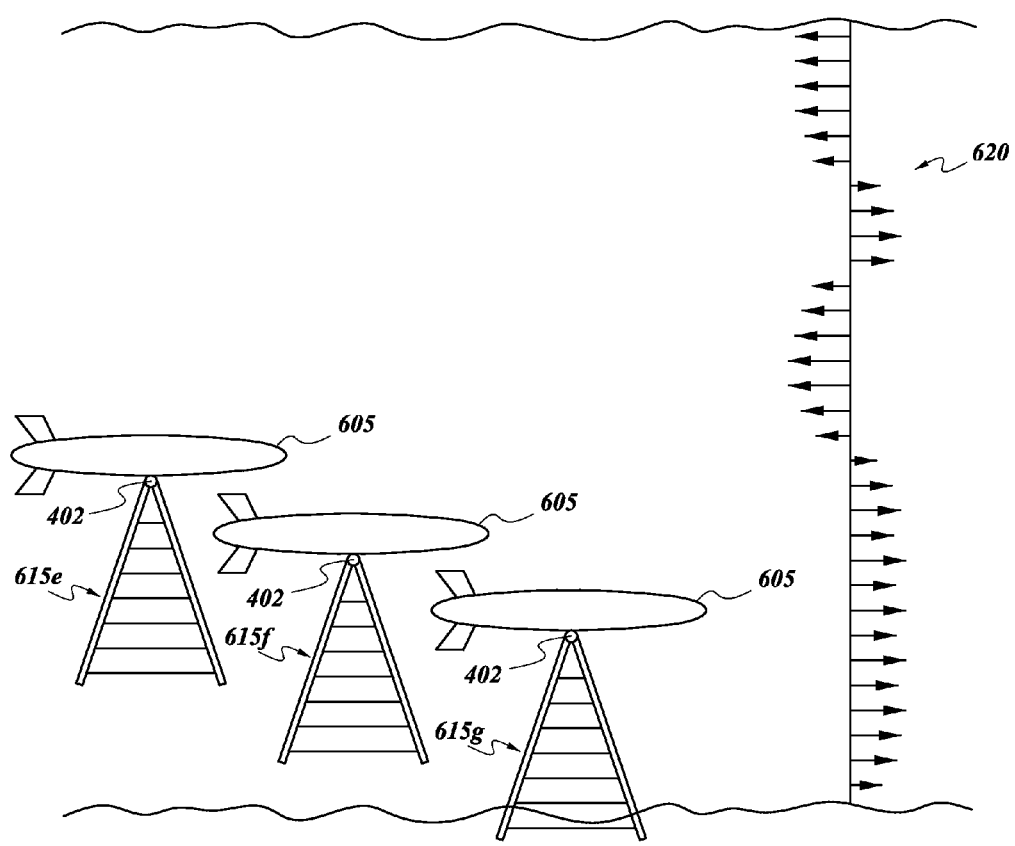
FIG. 8 illustrates an embodiment for navigating when the vehicle is sufficiently close to the bottom surface of the water for a bottom tracker to fix position.

FIG. 8 illustrates an embodiment for navigating when the vehicle is sufficiently close to the bottom for bottom tracker (bottom tracking ADCP 406) to fix position using the bottom tracker (bottom tracking ADCP 406). The current profile ranges 615e, 615f, and 615g illustrate the ranges of depths for which the profiling ADCP 402 estimates the current profile 620. When the vehicle descends towards the bottom and comes within range of the bottom, the processor 210 fixes vehicle trajectory and back corrects the estimates of vehicle position.

FIGS. 6, 7, and 8 characterize vehicle 605, such as an underwater vehicle (UV) that in an exemplary pathway the vehicle 605 starts on the surface in FIG. 6, descends in a spiral pattern in FIG. 7, and further descends towards the bottom in FIG. 8. In other scenarios, vehicle 605 ascends from the bottom to the surface. In other scenarios, the vehicle 605 starts at the surface, descends, and ascends to the surface without coming within bottom tracking range of the bottom. In other scenarios, the vehicle 605 travels below the surface, coming in and out of bottom tracking range of the bottom. For these scenarios, the vehicle 605 fixes a position using either an earth reference sensor (such as a GPS receiver 408) or a bottom tracker (such as a bottom tracking ADCP 406) and then travels out of range of both the earth reference sensor and bottom tracker. When out of range, the vehicle estimates the vehicle trajectory and the current profile using a current profiler (such as a profiling ADCP 402). When back in range, the vehicle fixes the vehicle position and back corrects vehicle trajectory.

Figure 9A:
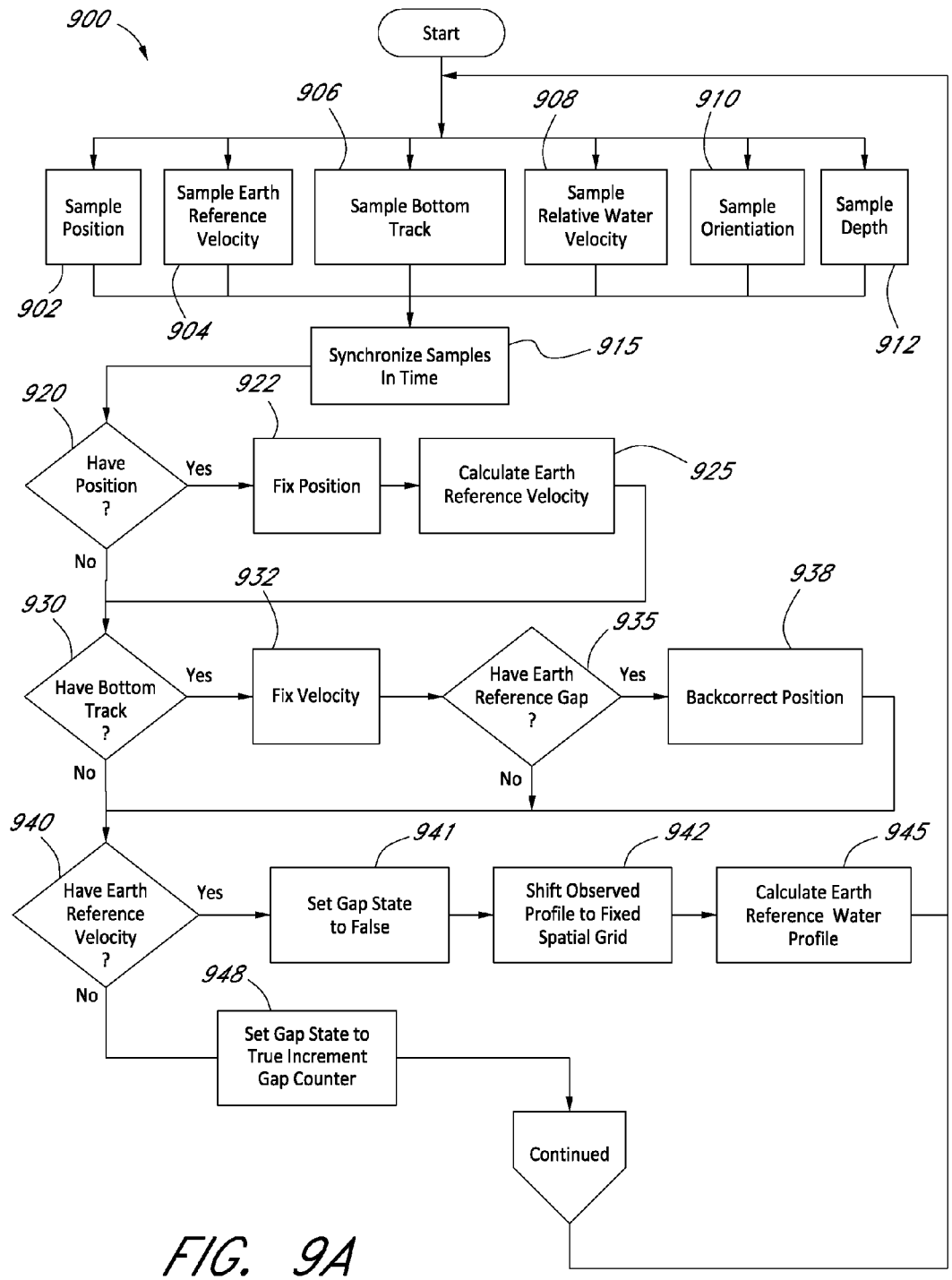
FIGS. 9A and 9B is a flowchart of an exemplary process for navigating a vehicle.
Figure 9B:
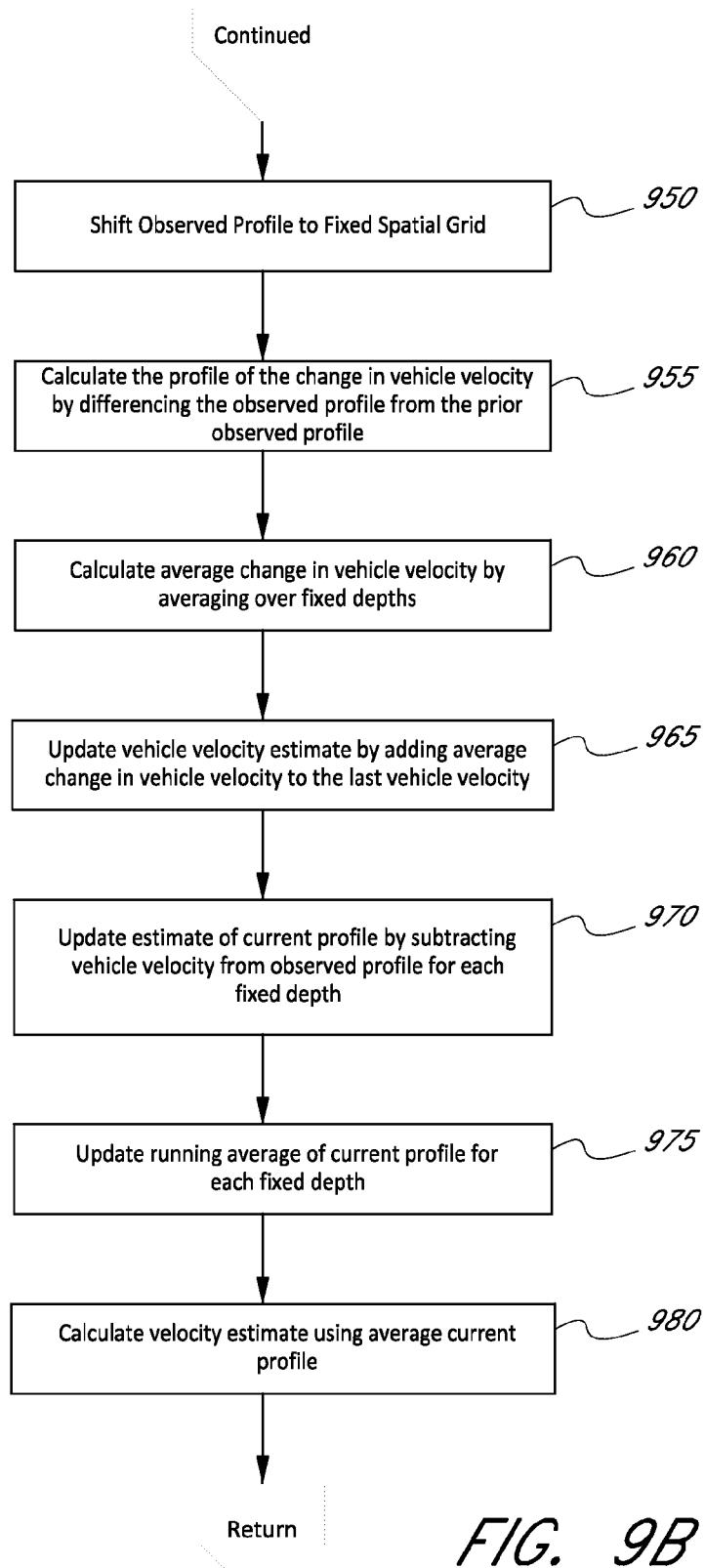

FIG. 9A is a flowchart of an exemplary process 900 for navigating a vehicle. FIG. 9B is the continuation of FIG. 9A. At block 902, the process 900 samples the vehicle position using GPS. At block 904, the process 900 samples the earth reference velocity using GPS. At block 906, the process 900 samples the vehicle bottom track (earth reference velocity). At block 908, the process 900 samples the relative water velocity as a function of depth. At block 910, the process 900 samples the vehicle orientation, comprising heading, pitch, and roll. At block 912, the process 900 samples the vehicle depth. The orientation sensor 207 and depth (pressure) sensors 209 provide accurate measures of heading, pitch, roll, and depth. The process 900 uses heading, pitch, and roll measures as required to convert all velocity measurements (from ADCP data, inertial data, GPS data, etc.) to place all velocity measurements into earth coordinate system. In step 915, the samples are synchronized in time.

When either a measured vehicle position is available, or an earth reference velocity measurement that enables calculation of vehicle velocity is available, decision block 920 "have position" is true. The position measure is sufficiently accurate to fix the position. In block 922, the process 900 fixes the position using data from the sampling position sensor 408. In block 925, the process 900 calculates the earth reference velocity based on the change in position.

When the vehicle 605 is close enough to the bottom so that the bottom tracker 406 is in range of the bottom, decision block 930 "have bottom track" is true. In block 932 the process 900 fixes the velocity of the vehicle using the bottom tracker information. The bottom tracker is sufficiently accurate to fix vehicle velocity and position. Decision block 935 is true if there is an earth reference gap because the earth reference was missing for the immediate previous sample(s) (the gap state is true, and the gap counter is non-zero). If decision block 935 is true, then in block 938 the process 900 back corrects the vehicle position to the last fixed position. One advantage of system 200 is that position errors grow linearly as opposed to non-linearly or exponentially. Therefore, once process 900 receives a fixed bottom track, process 900 back corrects to the prior fixed earth reference position using linear correction. This enables more accurate correction than would be possible if position error grew non-linearly or exponentially.

When an earth reference vehicle velocity measurement is available, decision block 940 "have earth reference velocity" is true. The earth reference velocity (GPS 408) measure is in range to fix the vehicle velocity. When decision block 940 is true, in block 941 the process 900 sets the gap state to false. In block 942 the process 900 shifts the observed profile to the fixed spatial grid. In block 945, the process 900 calculates and averages the earth reference vehicle water profile (or current profile), and returns to the start of the process to process the next time step. If block 945 is false, the process 900 sets the gap state to true and increments the gap counter in block 948.

FIG. 9B illustrates the continuation of the process of FIG. 9A, when the earth reference velocity is not available. When sensing relative water velocity with current profiler 402, the current profile and vehicle trajectory are estimated. There is a gap between the estimate and the actual current profile and the vehicle trajectory. In block 950, the process 900 uses measured depth to shift the observed profile to the fixed spatial grid. The process 900 uses interpolation to shift the observed profile to the fixed spatial grid sample heights.

The following equations can be used in differencing successive observed measurements. O, W, V, and η correspond to Observed, Water, Vehicle and Noise components of velocity measures. Subscript i−1, i and i+1 refer to time samples i−1, i and i+1. Superscript j−1, j, and j+1 refer to a series of profile bins in order from the sensor. The Δ symbol corresponds to the change from the previous sample.

An observed current profile includes water, vehicle, and noise velocity components:

Observed=Water+Vehicle+η

At time i for each depth bin j, $O_i^j = W_i^j + V_i + \eta_i$

In block 955, the process 900 calculates the profile of the change in vehicle velocity by differencing the observed profile from the prior observed profile. The Δ symbol corresponds to the change from the previous sample. For example, $\Delta V_i = V_i - V_{i-1}$ Therefore, the change in observed from the prior time sample at each depth bin is:

$\Delta O_i^j = \Delta W_i^j + \Delta V_i + \Delta \eta_i$ at the depth j

In block 960, the process 900 calculates the average change in vehicle velocity by averaging over fixed depths. If we assume that $W_i$ is relatively unchanging over short time scales at each depth j, $W_{i-1} = W_i = W_{i+1}$ $\Delta W_i = 0$ Then $\Delta O_i^j = \Delta V_i + \Delta \eta_i$ The observed profile varies as a function of depth, but the vehicle velocity does not vary with profile depth. Therefore, the change in vehicle velocity may be estimated by integrating the estimates at each depth cell of the change in vehicle velocity over the vertical profile. In a system where there are N bins that are common to both observed profiles the average change in vehicle velocity is estimated by averaging over spatial bins:

$$\overline{\Delta V_i} = \frac{1}{N} \sum_j \Delta V_i^j$$

In block 965, the process 900 updates the vehicle velocity estimate by adding the average change in vehicle velocity to the last vehicle velocity. Therefore, $V_{i+1} = V_i + \overline{\Delta V_i}$ In block 970, the process 900 updates the estimate of the current profile by subtracting vehicle velocity from the observed profile for each fixed depth. We then use this vehicle velocity to estimate the current profile $W_{i+1}^j = O_{i+1}^j - V_{i+1}$ In block 975, the process 900 updates the running averages of current profile for each fixed depth. For each depth bin j, we compute a running average of the water profile for each depth j over the time series for which there are $M^j$ measurements:

$$\overline{W^j} = \frac{i}{M^j} \sum_i W_i^j$$

In block 980, the process 900 calculates the velocity estimate using the average current profile. The velocity estimate from the average profile is:

$$V_i^j = O_i^j - \overline{W^j}$$

and $$\overline{V_i} = \frac{1}{N} \sum_j V_i^j$$

Moreover, the variance of the average change in velocity is twice the variance of noise divided by the number of bins. Therefore, averaging over more bins improves the velocity estimate. Not all embodiments will include all of the blocks described above. For example some embodiments may omit blocks 970, 975, and 980 are omitted.

After block 980, the process 900 returns to the start of the process to process the next time step.

Figure 10:
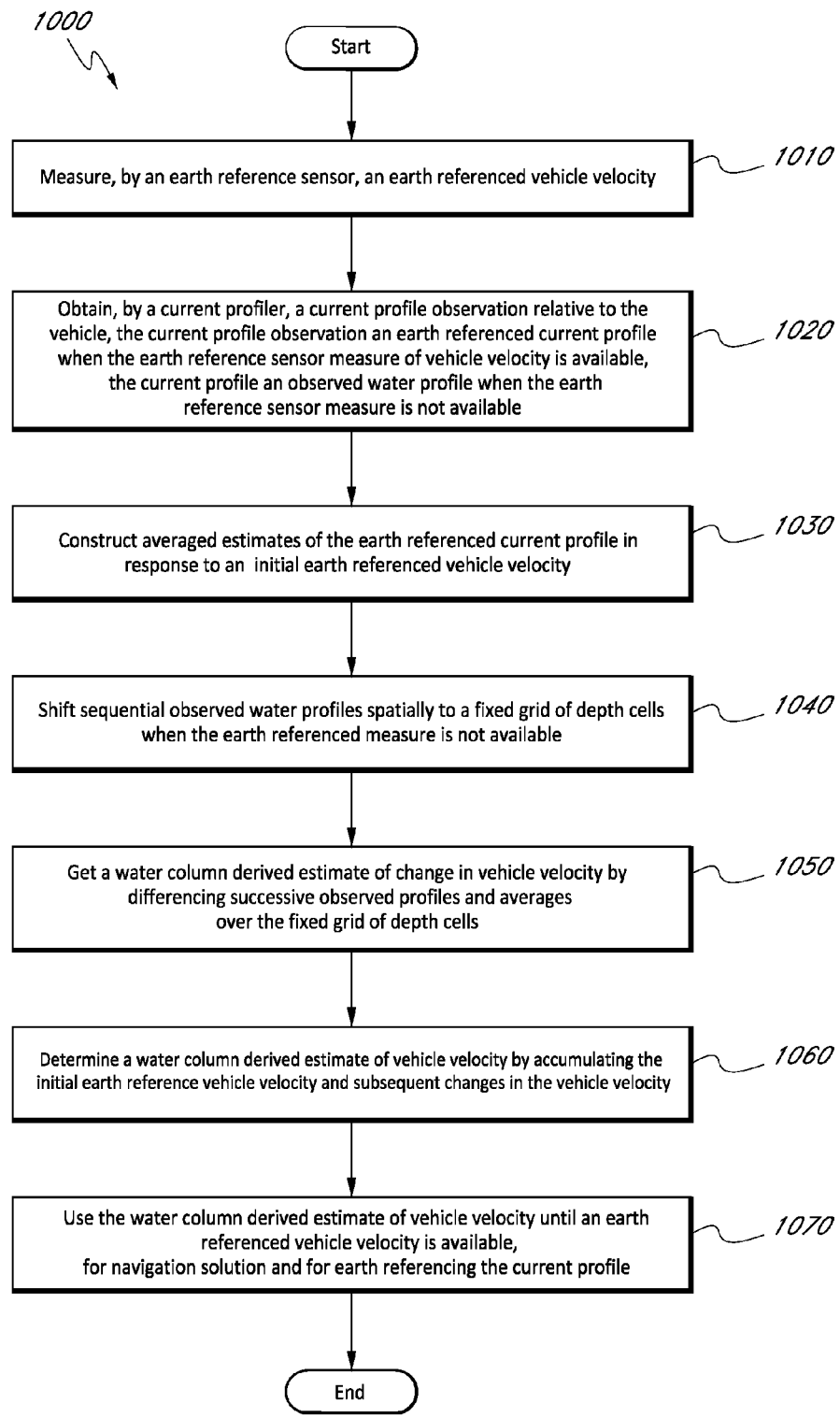
FIG. 10 is a flowchart that illustrates an example of a process by a vehicle to navigate.

FIG. 10 is a flowchart that illustrates an example of a process 1000 by a vehicle to navigate. At block 1010, process 1000 measures, by an earth reference sensor, an earth referenced vehicle velocity. At block 1020, process 1000 obtains, by a current profiler, a current profile observation relative to the vehicle. The current profile observation is an earth referenced current profile when the earth reference sensor measure of vehicle velocity is available. The current profile is an observed water profile when the earth reference sensor measure is not available. At block 1030, the process 1000 constructs averaged estimates of the earth referenced current profile in response to an initial earth referenced vehicle velocity. At block 1040, the process 1000 shifts sequential observed water profiles spatially to a fixed grid of depth cells when the earth reference measure is not available. At block 1050, the process 1000 gets a water column derived estimate of change in vehicle velocity by differencing successive observed profiles and averages over the fixed grid of depth cells. At block 1060, the process 1000 determines a water column derived estimate of vehicle velocity by accumulating the initial earth reference vehicle velocity and subsequent changes in the vehicle velocity. At block 1070, the process 1000 uses the water column derived estimate of vehicle velocity until an earth referenced vehicle velocity is available, for navigation solution and for earth referencing the current profile.

Specific embodiments of systems and methods of using of ADCP current profiles as a navigation aid to a descending UV are described herein. Although this disclosure describes certain features in the context of an underwater vehicle, it will be understood that the principles and advantages described herein can be applied in contexts related to aiding navigation of a moving platform underwater, including a water glider. While the specification, describes particular examples of the present invention, those of ordinary skill can devise variations of the present invention without departing from the inventive concept. Functionally separable aspects include, for example: 1) Differencing successive, vertically aligned profiles to isolate change in vehicle velocity at an instant in time; 2) Time averaging current profiles to get a quieter estimate of mean currents; 3) Using Bottom track as an earth reference, when available, to isolate vehicle motion from water motion; and 4) Linearly back correct navigation solution for position when bottom track becomes available, since error growth of the water column navigation is linear.

Moreover, any combination of features described herein can be implemented to provide integrated navigation features with a marine navigation system, a gyrocompass system, a steering control system, or the like. In certain embodiments, this can be an aid to an integrated navigation system, or enhance such systems to account for current profiles of water in which a platform is descending or otherwise moving.

CONCLUSION

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be connected to the processor such that the processor can read information from, and write information to, the storage medium. In the alternative, the storage medium may be integral to the processor. The processor and the storage medium may reside in an ASIC.

Depending on the embodiment, certain acts, events, or functions of any of the methods described herein can be performed in a different sequence, can be added, merged, or left out altogether (e.g., not ail described acts or events are necessary for the practice of the method). Moreover, in certain embodiments, acts or events can be performed concurrently, rather than sequentially.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

What is claimed is:

1. A system for navigating a vehicle, comprising:
   an earth reference sensor configured to measure an earth referenced vehicle velocity;
   a current profiler configured to obtain a current profile observation relative to the vehicle, the current profile observation comprising an earth referenced current profile when the earth reference sensor measure of vehicle velocity is available and, the current profile comprising an observed water profile when the earth reference sensor measure for determining vehicle velocity is unavailable; and
   a processor configured to:
      determine averaged estimates of the earth referenced current profile in response to an initial earth reference vehicle velocity;
      use sequential observed water profiles and shift them spatially to a vertically fixed grid of depth cells when the earth reference sensor measure for determining vehicle velocity is unavailable;
      determine a water column derived estimate of change in vehicle velocity by differencing successive observed profiles and averaging the difference over the vertically fixed grid of depth cells;
      determine a water column derived estimate of vehicle velocity by accumulating the initial earth reference vehicle velocity and subsequent changes in the vehicle velocity;
      use the water column derived estimate of vehicle velocity for navigation solution and for earth referencing the current profile when the earth reference sensor measure for determining vehicle velocity is unavailable.

2. The system of claim 1, the processor further configured to fix the vehicle velocity and back correct the vehicle position in response to the earth referenced vehicle velocity once the earth referenced vehicle velocity is re-obtained.

3. The system of claim 1, further comprising a bottom tracker configured to measure a bottom vehicle velocity relative to the bottom, wherein the processor is further configured to fix the vehicle velocity and back correct the vehicle position in response to the measured bottom vehicle velocity.

4. The system of claim 1, further comprising:
   a vehicle orientation sensor configured to measure heading, pitch, and roll; and
   a vehicle depth sensor configured to measure depth.

5. The system of claim 4, wherein the processor is further configured to synchronize in time the measured heading, the measured pitch, the measured roll, the measured depth, the measured vehicle velocity and the current profile observation.

6. The system of claim 1, wherein the earth reference sensor is further configured to measure vehicle position.

7. The system of claim 1, wherein the current profiler comprises an acoustic Doppler current profiler.

8. The system of claim 1, wherein the earth reference sensor comprises a GPS receiver.

9. The system of claim 1, wherein the earth reference sensor comprises a system configured to track the position of a fixed earth reference relative to the vehicle.

10. The system of claim 1, wherein the earth reference sensor comprises at least one of an inertial system, a global positioning system (GPS), a bottom tracking system, and a system configured to track the position of a fixed earth reference relative to the vehicle.

11. A method of vehicle navigation comprising:
    measuring, by an earth reference sensor, an earth referenced vehicle velocity;
    determining a current profile observation relative to the vehicle, the current profile observation comprising an earth referenced current profile when the earth reference sensor measure of vehicle velocity is available, and the current profile comprising an observed water profile when the earth reference sensor measure for determining vehicle velocity is unavailable;
    determining averaged estimates of the earth referenced current profile in response to an initial earth reference vehicle velocity;
    shifting sequential observed water profiles spatially to a vertically fixed grid of depth cells when the earth reference measure is unavailable;
    determining a water column derived estimate of change in vehicle velocity by differencing successive observed profiles and averaging the difference over the vertically fixed grid of depth cells;
    determining a water column derived estimate of vehicle velocity by accumulating the initial earth reference vehicle velocity and subsequent changes in the vehicle velocity; and
    using the water column derived estimate of vehicle velocity for navigation solution and for earth referencing the current profile when the earth reference sensor measure for determining vehicle velocity is unavailable.

12. The method of claim 11, further comprising fixing the vehicle velocity and back correcting the vehicle position in response to the earth referenced vehicle velocity once the earth referenced vehicle velocity is re-obtained.

13. The method of claim 12, wherein back correcting the vehicle position comprises linear correction.

14. The method of claim 11, further comprising:
    measuring a bottom vehicle velocity relative to the bottom;

fixing the vehicle velocity in response to the measured bottom vehicle velocity; and back correcting the vehicle position in response to the measured bottom vehicle velocity.

15. The method of claim 11, further comprising:
measuring vehicle orientation parameters, of at least, pitch, and roll; and
measuring vehicle depth.

16. The method of claim 15, further comprising synchronizing in time the measured heading, the measured pitch, the measured roll, the measured depth, the measured vehicle velocity and the measured current profile observation.

17. A system for navigating a vehicle comprising:
means for measuring an earth referenced vehicle velocity;
means for determining a current profile observation relative to the vehicle, the current profile observation comprising an earth referenced current profile when the measure of earth referenced vehicle velocity is available and the current profile comprising an observed water profile when the measure of earth referenced vehicle velocity is unavailable;
means for constructing averaged estimates of the earth referenced current profile in response to an initial earth reference vehicle velocity;
means for shifting sequential observed water profiles spatially to a vertically fixed grid of depth cells when the earth reference measure for determining vehicle velocity is unavailable;
means for determining a water column derived estimate of change in vehicle velocity by differencing successive observed profiles and averaging the difference over the vertically fixed grid of depth cells;
means for determining a water column derived estimate of vehicle velocity by accumulating the initial earth reference vehicle velocity and subsequent changes in the vehicle velocity; and
means for using the water column derived estimate of vehicle velocity for navigation solution and for earth referencing the current profile when the measure of earth referenced vehicle velocity is unavailable.

18. The system of claim 16, wherein the measuring earth reference vehicle velocity means comprises an earth reference sensor, the earth reference sensor comprising at least one of an inertial system, a global positioning system (GPS), a bottom tracking system, and a system configured to track the position of a fixed earth reference relative to the vehicle, wherein the obtaining a current profile observation means comprises a current profiler, wherein the constructing averaged estimates means comprises a processor, wherein the shifting means comprises the processor, wherein the water column derived estimate of vehicle velocity getting means comprises the processor, and wherein the using water column derived estimate for navigation means comprises the processor.

* * * * *

UNITED STATES PATENT AND TRADEMARK OFFICE
CERTIFICATE OF CORRECTION

| | | |
|---|---|---|
| PATENT NO. | : 9,500,484 B2 | Page 1 of 1 |
| APPLICATION NO. | : 14/439213 | |
| DATED | : November 22, 2016 | |
| INVENTOR(S) | : Brandon S. Strong | |

It is certified that error appears in the above-identified patent and that said Letters Patent is hereby corrected as shown below:

In the Drawings

Sheet 10 of 12 (Reference Numeral 910, FIG. 9A) at Line 2, Change "Orientiation" to --Orientation--.

Sheet 10 of 12 (Reference Numeral 938, FIG. 9a) at Line 1, Change "Backcorrect" to --Back correct--.

In the Specification

In Column 1 at Line 27, Change "ceils" to --cells--.

In Column 2 at Line 36, Change "farther" to --further--.

In Column 2 at Line 47, Change "farther" to --further--.

In Column 2 at Line 53, Change "farther" to --further--.

In Column 8 at Line 13 (approx.), Change "(ADCP)," to --(ADCP).--.

In Column 10 at Line 20, Change "(UPS)." to --(GPS).--.

In Column 12 at Line 29 (approx.), Change "the" to --each--.

In Column 14 at Line 63, Change "Hash" to --flash--.

In the Claims

In Column 17 at Line 12, In Claim 16, after "the" delete "measured".

In Column 18 at Line 13 (approx.), In Claim 18, change "16," to --17,--.

Signed and Sealed this
First Day of May, 2018

Andrei Iancu
*Director of the United States Patent and Trademark Office*